United States Patent [19]

Cannan et al.

[11] Patent Number: 5,139,759
[45] Date of Patent: Aug. 18, 1992

[54] SYNTHESIS OF ZEOLITE BETA

[75] Inventors: Thomas R. Cannan, Congers; Richard J. Hinchey, Thornwood, both of N.Y.

[73] Assignee: UOP, Des Plaines, Ill.

[21] Appl. No.: 810,093

[22] Filed: Dec. 19, 1991

[51] Int. Cl.$^5$ .............................................. C01B 33/34
[52] U.S. Cl. .................................................. 423/328
[58] Field of Search ................. 423/328, 329, 330; 502/60, 64, 77

[56] References Cited

U.S. PATENT DOCUMENTS

| | | | |
|---|---|---|---|
| 3,308,069 | 3/1967 | Wadlinger et al. | 423/328 |
| 4,554,145 | 11/1985 | Rubin | 423/328 |
| 4,642,226 | 2/1987 | Calvert et al. | 423/328 |
| 4,923,690 | 5/1990 | Valyocsik et al. | 423/328 |

*Primary Examiner*—R. Bruce Breneman
*Attorney, Agent, or Firm*—Thomas K. McBride; Richard G. Miller

[57] ABSTRACT

Zeolite beta is synthesized hydrothermally from an aqueous reaction mixture containing the conventional reactive sources of $SiO_2$, $Al_2O_3$ and $Na_2O$ tetraethylammonium halide as the source of the crystallization directing tetraethylammonium ions and diethanolamine as the agent providing the increased basicity necessary for the formation of zeolite beta crystals. Seed crystals of zeolite beta are optionally employed to shorten the crystallization period.

4 Claims, No Drawings

SYNTHESIS OF ZEOLITE BETA

BACKGROUND OF THE INVENTION

1. Field of the Invention

The present invention relates to a new and improved process for synthesizing zeolite beta. More particularly it relates to a hydrothermal synthesis of zeolite beta in which the organic directing agent is the tetraethylammonium ion imparted to the reaction mixture in the form of a tetraethylammonium halide, preferably the bromide salt. The essential high degree of alkalinity of the reaction mixture is provided by a combination of NaOH and diethanolamine. Optionally seed crystals of zeolite beta are employed to shorten the crystallization period.

2. Discussion of the Prior Art

Zeolite beta and the method for its preparation were first described in U.S. Pat. No. 3,308,069, issued Mar. 7, 1967, to R. L. Wadlinger et al. As reported therein, zeolite beta has a chemical composition in its as-synthesized form expressed in terms of molar oxide ratios of $$[xNa_2O+(1.0\pm0.1-x)TEA_2O]:Al_2O_3:ySiO_2:aH_2O$$

wherein "x" has a value of less than 1.0, "y" has a value of greater than 10 but less than 200 and "a" has a value of up to 4 depending upon the degree of hydration of the zeolite. In the formula, "TEA" represents the tetraethylammonium cation. The zeolite is said to be formed by crystallization at elevated temperatures in the range of 75° C. to 200° C. from an aqueous reaction mixture containing tetraethylammonium hydroxide (TEAOH) as the alkali and reactive sources of $Na_2O$, $Al_2O_3$ and $SiO_2$. The composition of the reaction mixture, expressed in terms of mol ratios of oxides, falls within the following ranges $SiO_2/Al_2O_3$—from about 10 to about 200
$Na_2O/TEA_2O$—from about zero to 0.2
$TEA_2O/SiO_2$—from about 0.05 to about 0.5
$H_2O/TEA_2O$—from about 40 to about 150

The more significant, i.e., characterizing, interplanar d-spacings of zeolite beta, dried in air at 110° C., are shown in Table A, below:

TABLE A

| Interplanar d-Spacing (A) | Relative Intensity ($I/I_o$) |
|---|---|
| 11.5 ± 0.4 | M-S |
| 7.4 ± 0.2 | W |
| 6.6 ± 0.15 | W |
| 4.15 ± 0.10 | W |
| 3.97 ± 0.10 | VS |
| 3.00 ± 0.07 | W |
| 2.05 ± 0.05 | W |

In a later reported synthesis of zeolite beta reported in U.S. Pat. No. 4,554,145, M. K. Rubin, the organic directing agent employed was derived from dibenzyl-1,4-diazabicyclo [2,2,2] octane chloride. The synthesis involved the preparation of a reaction mixture containing sources of alkali metal oxide, an oxide of aluminum, an oxide of silicon, water and the cation of the aforesaid organic compound in proportions within the following ranges:

$SiO_2/Al_2O_3$—5 to 250
$H_2O/SiO_2$—10 to 100
$OH^-/SiO_2$—0.09 to 0.8
$R/(R+M)$—0.1 to 0.8 wherein R represents the organic cation and M represents the alkali metal cation. The quantity of $OH^-$ ion is calculated using only the contribution of inorganic alkali. Crystallization of the zeolite beta was accomplished in the two specific preparations disclosed at 99° C. and 100° C. over periods of 119 and 169 days, respectively. Zeolite P and mordenite types of crystalline impurities were found in the products along with zeolite beta.

In U.S. Pat. No. 4,642,226, issued Feb. 10, 1987, to R. B. Calvert et al, the synthesis of zeolite beta using the dibenzyldimethylammonium ion as the directing agent is reported. The organic cations are derived from dibenzyldimethylammonium chloride added to the reaction mixture per se or produced therein in situ by the reaction of benzyl chloride with dimethylbenzylamine. It is stated that the composition of the reaction mixture is critical with respect to the presence of alkali-derived $OH^-$ groups and the $SiO_2/Al_2O_3$ molar ratio. The latter cannot be greater than 250 and the former, as determined by the ratio $OH^-/SiO_2$, cannot be less than 0.1 to prevent the formation of another unspecified silicate as the principal crystalline product. The broad composition ranges for the reaction mixture are disclosed as:

$SiO_2/Al_2O_3$—20 to 50
$H_2O/SiO_2$—10 to 200
$OH^-/SiO_2$—0.10 to 2.0
$M^+/SiO_2$—0.05 to 1.0
$R/SiO_2$—0.10 to 2.0 wherein R represents the dibenzyldimethylammonium ion and $M^+$ represents an alkali metal ion from which the $OH^-$ ion concentration is calculated exclusively. Maintaining the reaction mixtures at 80° C. to 175° C. for 24 hours to 120 days is said to be required to produce crystals of zeolite beta. At 100° C. a digestion, i.e., crystallization, period of 115 days was found to produce a product containing 55% zeolite beta.

What is believed to be the most recently reported synthesis of zeolite beta is reported in U.S. Pat. No. 4,923,690, Valyocsik et al. In accordance with the process disclosed, a mixture of tetraethylammonium halide and tetraethylammonium hydroxide is disclosed as a feasible crystallization directing agent. Either the hydroxide or the halide salt used alone is also reported to be suitably employed to yield a zeolite beta-containing product which is 30% to 90% crystalline of which, presumably, zeolite beta can constitute essentially all or some minor portion thereof.

SUMMARY OF THE INVENTION

It has now been discovered that zeolite beta can be produced in good yield using relatively short crystallization periods from reaction mixtures in which the templating agent is the tetraethylammonium ion derived from the corresponding tetraethylammonium halide rather than the much more expensive tetraethylammonium hydroxide. The reaction mixture contains in addition to alkali metal hydroxide and conventional sources of aluminum and silicon, a sufficient quantity of diethanolamine to provide the alkalinity needed to form zeolite beta without also causing the concomitant formation of extraneous crystalline silicates.

In accordance with the present invention, zeolite beta is synthesized by forming a reaction mixture having a composition having the following molar ratios:

|   | Broad | Preferred |
|---|---|---|
| $SiO_2, Al_2O_3 =$ | 10 to 200 | 20 to 40 |
| $M_2O/SiO_2 =$ | 0.01 to 0.1 | 0.04 to 0.08 |
| $(M_2O + R)/SiO_2 =$ | 1.0 to 0.2 | 0.3 to 0.6 |
| $H_2O/(M_2O + R) =$ | 20 to 60 | 30 to 50 |
| $R/(R + R') =$ | 0.2 to 0.8 | 0.4 to 0.6 | wherein R represents a tetraethylammonium halide, preferably the bromide salt, R' represents diethanolamine, and M represents an alkali metal cation, preferably sodium. The mixture is maintained for about 48 hours to 14 days at a temperature of from about 100° C. to 175° C., preferably 100° C. to 150° C., until crystals of zeolite beta form. Thereafter the solid product is isolated, for example by filtration or centrifugation, and washed with water. In accordance with an optional, and preferred, embodiment, the reaction mixture is seeded with crystals of zeolite beta to shorten the crystallation period and enhance the yield of zeolite beta.

DETAILED DESCRIPTION OF THE INVENTION

In carrying out the zeolite beta synthesis of the present invention the reaction mixture can be prepared using a combination of tetraethylammonium halide and diethanolamine and inorganic reagents well known in the zeolite synthesis art to provide reactive sources of aluminum, silicon and alkali metals. Such inorganic reagents include aluminates, aluminas, silicates, silica hydrosols, reactive amorphous solid silicas, silica gel, silicic acid and alkali metal hydroxides. A combination of two or more such reagents can supply the requirement for any essential inorganic constituent of the zeolite beta product. For example, sodium hydroxide and sodium aluminate can together provide the requirement for alkali metal.

It is an important aspect of the present process that the so-called templating or crystallization directing agent be the tetraethylammonium ion and that this ion be provided by a tetraethylammonium halide, preferably the chloride or the bromide, but most preferably the bromide salt. This reagent is as effective in imparting the tetraethylammonium cation to the reaction mixture as is the hydroxide, i.e., TEAOH, and is a much less expensive reagent. On the other hand, the TEA halide is a more or less neutral salt so that the necessary alkalinity of the reaction mixture must be provided by some other source. It is known, however, that there are definite limits upon the quantity of alkali metal hydroxide which can be present in the reaction if zeolite beta, rather than some other zeolite species such as mordenite, is to be crystallized. Thus it has been proposed to employ a mixture of the maximum proportion of alkali metal hydroxide and the minimum proportion of TEAOH possible to avoid the high costs of producing zeolite beta. Such mixtures tend, however, to produce undesirable amounts of mordenite in the zeolite beta product. That particular problem can be obviated by using a mixture of TEABr and TEAOH in conjunction with NaOH, but the costs of synthesis are higher.

It has been found that diethanolamine can serve to provide the necessary alkalinity when used in conjunction with an alkali metal hydroxide such as NaOH. Diethanolamine is much less expensive than the tetraethylammonium compounds and when employed in conjunction with an alkali metal hydroxide does not direct the crystallization toward the formation of extraneous phases, particularly mordenite. This is a highly surprising finding, since diethanolamine is known to be an effective templating agent in its own right in the formation of other crystalline molecular sieve species and is, in fact, the templating agent used in the production of both a zeolitic gallosilicate and an aluminosilicate which have the crystal structure of mordenite as reported in EPC application No. 84 304025, published Jan. 2, 1985, under Publication No. 0,130,013. Also, in the phosphorus-containing aluminosilicates, i.e., the so-called SAPO molecular sieves, diethanolamine when used alone as the organic base, readily directs the formation of the SAPO-5 species, a microporous molecular sieve having a unique crystal structure not topologically related to zeolite beta. While not wishing to be bound by any particular theory it appears that the diethanolamine does not occur in the product zeolite beta crystals as a charge-balancing cation for $AlO_2^-$ tetrahedra and does not enter into the templating mechanism for the formation of zeolite beta in the present process. If it is present in the pore system of the as-synthesized zeolite beta product, it is apparently removed by the post-synthesis water washing.

In preparing the reaction mixture, the reagents and the order in which the reagents are combined are not critical factors. It is preferred to utilize alumina trihydrate as the alumina source, NaOH as the alkali metal source and a reactive amorphous solid silica as the silicon source, although an aqueous silica sol is entirely satisfactory. In the formation of the reaction mixture it is preferred to dissolve the alumina trihydrate in an aqueous NaOH solution, add the organic reagents in the form of an aqueous solution to the silica source, and then add the sodium aluminate to the silica-containing mixture. If seed crystals of zeolite beta are employed, they are imparted to the reaction mixture as the final constituent. The quantity of beta seed crystals employed is not critical and can advantageously be employed in amounts of from about 0.0 to 5 wt. % of the overall reaction mixture exclusive of the seed crystals themselves. It is preferred that the seed crystals be present in an amount (anhydrous basis) of 2 to 5 weight percent of the $SiO_2$ content of the reaction mixture. The zeolite beta used as the source of seed crystals can be prepared by the present or any prior known procedure. The seed crystals can be of the as-synthesized zeolite beta or in the organic-free calcined form, the latter state being preferred when the organic templating agent utilized in their synthesis is other than the $TEA^+$ ion. The crystallization stage of the synthesis is advantageously carried out in a sealed reactor equipped with moderate stirring or agitation means. At the end of the crystallization period the product crystals are recovered by conventional means, washed with water and dried in air.

The present process is illustrated by the following examples:

EXAMPLE 1

(a) Zeolite beta was crystallized from a reaction mixture having the molar composition:

1.5 $Na_2O$:3.0 $(TEA)_2O$:6 $(EtOH)_2NH$:$Al_2O_3$:25 $SiO_2$:300 $H_2O$ to which zeolite beta seed crystals were added in an amount of about 10% by weight (anhydrous) of the $SiO_2$ content. The reaction mixture was prepared by dissolving 38.99 grams of alumina trihydrate in 60 grams of a 50% aqueous NaOH solution at boiling temperature to form sodium aluminate. The resulting composition was cooled to below 100° C. and diluted with about 50 grams of water. A second solution was formed by dissolving 315.24 grams of TEABr in 295.78 grams of water, to which was added 185.54 grams of an 85% aqueous diethanolamine solution. The combined organic reagent solution was then added, with vigorous mixing, to 1251.7 grams of a commercially available aqueous silica sol (Ludox) containing 30% by weight of $SiO_2$, and thereafter the sodium aluminate solution, at ambient room temperature, was added to the silica-organics mixture. The resulting mixture was stirred until homogeneous and then the zeolite beta seed crystals were added and uniformly distributed therethrough by vigorous mixing for about 5 minutes. The final composition was sealed in a 2-liter reactor equipped with stirring means and heated to 150° C. After about 68 hours at 150° C. the reactor was cooled to ambient room temperature, a 50 ml. sample removed and the solid product recovered (hereinafter Product 1A). The reactor was again sealed and heated for an additional 72 hours at 175° C. The solid composition recovered from this 175° C. crystallization is identified hereinafter as Product 1B. Both Products 1A and 1B were washed with water and dried in air at 100° C.

(b) The x-ray powder diffraction patterns of portions of Products 1A and 1B were obtained. The data concerning the more significant d-spacings are set forth below. These data were determined by standard technique. The radiation was the K-alpha doublet of copper, and a diffraction equipped with a scintillation counter and a strip chart pen recorder was used. The peak heights, I, and the positions as a function of two times theta, where theta is the Bragg angle, were read from the spectrometer chart. From these, the relative intensities, 100 $I/I_o$ where $I_o$ is the intensity of the strongest line or peak, and d (obs.), the interplanar spacing in Angstrom units (A) corresponding to the recorded lines, were calculated. In the tables below the relative intensities are given in terms of the symbols W=weak, M=medium, S=strong and VS=very strong.

| d,A | Rel. Int. |
|---|---|
| Product 1A | |
| 11.6 | S |
| 7.4 | W |
| 4.15 | M |
| 3.96 | VS |
| 3.32 | MW |
| 3.03 | MW |
| Product 1B | |
| 11.6 | S |
| 7.5 | W |
| 4.16 | M |
| 3.99 | VS |
| 3.33 | MW |
| 3.04 | MW |

(c) Portions of both Products 1A and 1B were calcined in air at 600° C. for 1 hour and then analyzed to determined their sorptive capacity for oxygen at −183° C. and 100 torr $O_2$-pressure and for $SF_6$ at room temperature (~23° C.) and 400 torr $SF_6$-pressure. Surface areas were also determined by nitrogen adsorption using the one point B-E-T method. The results are shown below:

| Composition | $O_2$ Adsorption | $SF_6$ Adsorption | Surface Area |
|---|---|---|---|
| Product 1A | 27.71 wt. % | 29.35 wt. % | 666 m²/g |
| Product 1B | 27.88 wt. % | 31.05 wt. % | 672 m²/g |

(d) Product 1B was analyzed for chemical composition in its as-synthesized (uncalcined) form. Duplicate analyses for carbon and nitrogen were made. The results appear below:

| | |
|---|---|
| $Al_2O_3$ | 5.35 wt. % |
| $SiO_2$ | 74.4 wt. % |
| C | 11.41 and 11.44 wt. % |
| N | 1.60 and 1.61 wt. % |
| $Na_2O$ | <0.27 wt. % |
| LOI (1000° C.) | 20.7 wt. % |
| $(TEA)_2O$ (by C) | 16.44 wt. % |
| $(TEA)_2O$ (by N) | 15.84 wt. % |

In terms of molar oxide ratios, and assuming all of the carbon is attributable to the $TEA^+$ ion, the chemical composition was (anhydrous basis)

0.08 $Na_2O$:1.13 $(TEA)_2O$:$Al_2O_3$:23.6 $SiO_2$

In view of the facts that the C/N ratio value by analysis was 8.3, $(TEA)_2O$ has a C/N ratio of 8:1 and diethanolamine has a C/N ratio of 4:1, it is very likely that the diethanolamine was not present as a zeolitic cation and any occluded diethanolamine was removed by the water washing.

(e) The average particle size of Product 1A and Product 1B were determined by sedigraph to be 1.49 micrometers and 1.35 micrometers, respectively. The crystallites forming the particles appear by SEM analyses to be very small, i.e., less than 0.1 micrometer.

EXAMPLE 2

Using the same reagents, reagent proportions and procedures as in Example 1, supra, a reaction mixture scaled up by a factor of two was prepared up to the point where the zeolite beta seed crystals were incorporated. To demonstrate the effect of the seed crystals on the crystallization period, the same zeolite beta seeds as in Example 1 were added to half of the reaction mixture in an amount of 2.054 wt. % of the overall reaction mixture (calculated on the basis of anhydrous zeolite). Assuming 20% LOI of the seed crystals, the seeds represented 10% by weight of the $SiO_2$ content of the reaction mixture. Each of the seeded and unseeded portions of the reaction mixture were sealed in a 2-liter reactor. The seeded gel was digested for 66 hours at 150° C. and the unseeded gel for 72 hours at 150° C., both gels being stirred over the entire digestion period. By x-ray analysis the solid product of the seeded gel was found to be a well-crystallized zeolite beta. In the case of the unseeded gel, only a small amount of zeolite beta had formed. Doubling the crystallization period will result in a zeolite beta of high crystallinity. The rate of zeolite beta crystal formation is also significantly increased by an increase of the crystallization temperature to at least 175° C.

By chemical analysis the composition of the beta from the seeded synthesis was determined to be (anhydrous basis):

0.12 $Na_2O$:1.17 $(TEA)_2O$:$Al_2O_3$:22.83 $SiO_2$

The (TEA)₂O content was based on the carbon rather than the nitrogen analysis. In terms of weight percent, the composition was:
   $Al_2O_3$—5.30
   $SiO_2$—71.3
   $Na_2O$—0.372
   C—11.69
   N—1.63
   LOI (1000° C.)—23.2

The surface area was determined to be (after calcination at 600° C. for 1 hour) 677 m²/g. Oxygen adsorption capacity was 27.64 wt. % (−183° C., 100 torr). SF₆ adsorption capacity at 22.3° C. and 400 torr, was 29.97 wt. %.

EXAMPLE 3

In the synthesis of Example 1, supra, the tetraethylammonium bromide templating agent and the diethanolamine were utilized in amounts such that there were three moles of each per mole of aluminum in the reaction mixture. For purposes of comparison, reaction mixtures as in Example 1 were prepared except that in one instance the tetraethylammonium bromide content was reduced to the level of two moles per mole of aluminum, and in a second instance no TEABr at all was employed.

(a) Using the same mixing procedure as reported in Example 1, the following quantities of reagents were combined to form a reaction mixture:
   aqueous silica sol (30% $SiO_2$)—1001.3 grams
   alumina trihydrate—31.19 grams
   NaOH (50% aq. sol.)—48.00 grams
   TEABr—168.13 grams
   Diethanolamine (85% aq. sol)—148.43 grams
   $H_2O$—316.59 grams
   Beta seed crystals—37.55 grams *

* 20% LOI assumed

To incorporate the TEABr into the reaction mixture, it was dissolved in 266.59 grams of water, combined with the diethanolamine, and added to the silica sol. The final reaction mixture was digested in a sealed 2-liter reactor at 150° C. for 72 hours with agitation. By x-ray analysis, the product was found to be well-crystallized zeolite beta.

(b) Except for any aspect of the procedure involving TEABr, the following quantities of reagents were combined according to the procedure of part (a) above aqueous silica sol (30% $SiO_2$) - 1001.3 grams
   alumina trihydrate - 31.19 grams
   NaOH (50% aq. sol.) - 48.00 grams
   TEABr - --
   Diethanolamine (85% aq. sol.) - 148.43 grams
   $H_2O$ - 321.04 grams
   Beta seed crystals - 37.55 grams *

* 20% LOI assumed

The reaction mixture was digested for 72 hours at 150° C. with agitation in a 2-liter sealed reactor. By x-ray analysis, the product was found to be a well-crystallized zeolite of the MFI type, believed to be ZSM-5.

What is claimed is:

1. Process for synthesizing zeolite beta which comprises forming a reaction mixture having a composition in terms of mole ratios within the ranges:

| | | |
|---|---|---|
| $SiO_2/Al_2O_3$ | = | 10 to 200 |
| $M_2O/SiO_2$ | = | 0.01 to 0.1 |
| $(M_2O + R)/SiO_2$ | = | 1.0 to 0.2 |
| $H_2O/(M_2O + R)$ | = | 2.0 to 60 |
| $R/(R + R')$ | = | 0.2 to 0.8 | wherein R represents a tetraethylammonium halide, R' represents diethanolamine, and M represents an alkali metal cation, and maintaining said mixture at a temperature of from 100° C. to 175° C. until crystals of zeolite beta form.

2. Process according to claim 1 wherein the reaction mixture composition is

| | |
|---|---|
| $SiO_2/Al_2O_3$ = | 20 to 40 |
| $M_2O/SiO_2$ = | 0.04 to 0.08 |
| $(M_2O + R)/SiO_2$ = | 0.3 to 0.6 |
| $H_2O/(M_2O + R)$ = | 30 to 50 |
| $R/(R + R')$ = | 0.4 to 0.6 | and wherein M represents the sodium cation and R represents tetraethylammonium bromide.

3. Process according to claim 1 wherein the reaction mixture contains seed crystals of zeolite beta in an amount effective to expedite the formation of additional crystals of zeolite beta.

4. Process according to claim 2 wherein the reaction mixture contains seed crystals of zeolite beta in an amount of from about >0 to 5 weight percent, anhydrous basis, based on the weight of $SiO_2$ present.

* * * * *